United States Patent [19]
Cragg

[11] 3,901,337
[45] Aug. 26, 1975

[54] WHEEL CHAIRS
[75] Inventor: Harold Cragg, Birmingham, England
[73] Assignee: The Spastics Society, London, England
[22] Filed: Nov. 22, 1972
[21] Appl. No.: 308,790

[30] Foreign Application Priority Data
Nov. 24, 1971 United Kingdom............... 54518/71

[52] U.S. Cl.................... 180/6.5; 74/405; 180/65 F; 180/DIG. 3
[51] Int. Cl......................... B60k 7/60; B62d 11/04
[58] Field of Search ... 180/6.5, 19 R, 64 MM, 65 F, 180/DIG. 3; 74/405, 211

[56] References Cited
UNITED STATES PATENTS

| | | | |
|---|---|---|---|
| 2,211,260 | 8/1940 | Donald | 180/19 R X |
| 2,468,801 | 5/1949 | Beall | 180/DIG. 3 |
| 2,798,565 | 7/1957 | Rosenthal et al. | 180/6.5 |
| 3,035,386 | 5/1962 | Jepson et al. | 180/19 R X |
| 3,139,844 | 7/1964 | Landers | 74/405 X |
| 3,613,813 | 10/1971 | Biddle | 180/6.5 |

*Primary Examiner*—Robert J. Spar
*Assistant Examiner*—Leslie J. Paperner
*Attorney, Agent, or Firm*—Imirie, Smiley & Linn

[57] ABSTRACT

In a wheel chair, electric driving means pivotally supported for movement between an operative driving position in which a wheel pinion and driven pinion are coupled, and an inoperative position in which the pinions are uncoupled leaving the wheel free for normal rotation free of any coupling to the electric driving means. Preferably the wheel and electric driving means is supported on the wheel chair frame by a resilient mounting embodying a suspension media providing independent suspension for the rear wheels.

12 Claims, 6 Drawing Figures

WHEEL CHAIRS

BACKGROUND OF THE INVENTION

This invention is concerned with improvements in or relating to wheel chairs. In particular, this invention is concerned with electric driving means suitable for a wheel chair, as well as a wheel chair embodying electric driving means.

Many different forms of electric driving means for wheel chairs have already been proposed and certain proposals have been used. Many forms of electric drive now in use embody power transmissions including belts. Because of various factors, such belts can be hazardous to invalid users, and in fact the use of power driven wheel chairs with belt transmission is precluded in certain countries. To avoid this problem there have been various proposals to provide a direct form of drive transmission from an electric motor instead of belts. However, these proposals have not been acceptable because the wheel chairs have been so cumbersome, bulky and heavy, or the driving arrangement has been so complicated and such that when a power failure or other fault has developed, it has not been possible for the wheel chair to be manually propelled either by the invalid or an ambulant person.

SUMMARY OF THE INVENTION

An object of this invention is to provide an improved form of electric driving means for a wheel chair which attempts to overcome the foregoing disadvantages, and to provide a simple, inexpensive arrangement with adequate versatility for use with different designs of wheel chairs.

According to this invention, I provide an electric driving means for a wheel chair comprising an electric motor operable by a battery through control means, drive transmitting means coupled to the electric motor and including an output shaft carrying a driven pinion, a wheel plate supporting a rotatable wheel carrying a fixed pinion engageable with said driven pinion, mounting means for mounting said wheel plate on a frame member of the wheel chair, and means supporting said drive transmitting means on said wheel plate for relative pivotal movement between two extreme positions in the first of which said driven and fixed pinions are engaged for driving the wheel on operation of the electric motor, and in the second position the drive pinion is disengaged to permit free rotation of the wheel.

This invention is also deemed to include wheel chairs embodying such electric driving means. To simplify further explanation of this invention it will be assumed that the electric driving means is mounted on a wheel chair.

As will be appreciated, with the arrangement according to this invention, in the event of a failure in the electric drive, it is only necessary for the driver to pivot the drive transmitting means into an inoperative position whereby the output pinion is disengaged from the fixed pinion. When this has been done any effort expanded in propelling the wheel chair manually does not include any effort as would be required to turn over the electric motor and the drive transmitting means.

According to a preferred feature of this invention said wheel plate is resiliently carried by a mounting bracket adapted for connection to the frame member. Preferably, the mounting bracket includes a bushing providing a suspension media arranged to permit resilient movement of the wheel plate independent of the frame member. For instance, the bushing may be of the type wherein concentric inner and outer metal bushes are bonded together by an annular intermediate member of a resilient elastomeric material such as rubber. Thus, as it is envisaged that the electric driving means according to this invention will be applied to both rear wheels of a wheel chair this preferred construction will provide independent suspension on the two rear wheels.

It is envisaged that the electric driving means could be employed with front wheels of a wheel chair but for most practical purposes this would not be preferred.

In order that this invention be understood clearly, an exemplary embodiment of a wheel chair including electric driving means in accordance with this invention is depicted in the accompanying drawings.

DESCRIPTION OF THE PREFERRED EMBODIMENT

Figure 1:
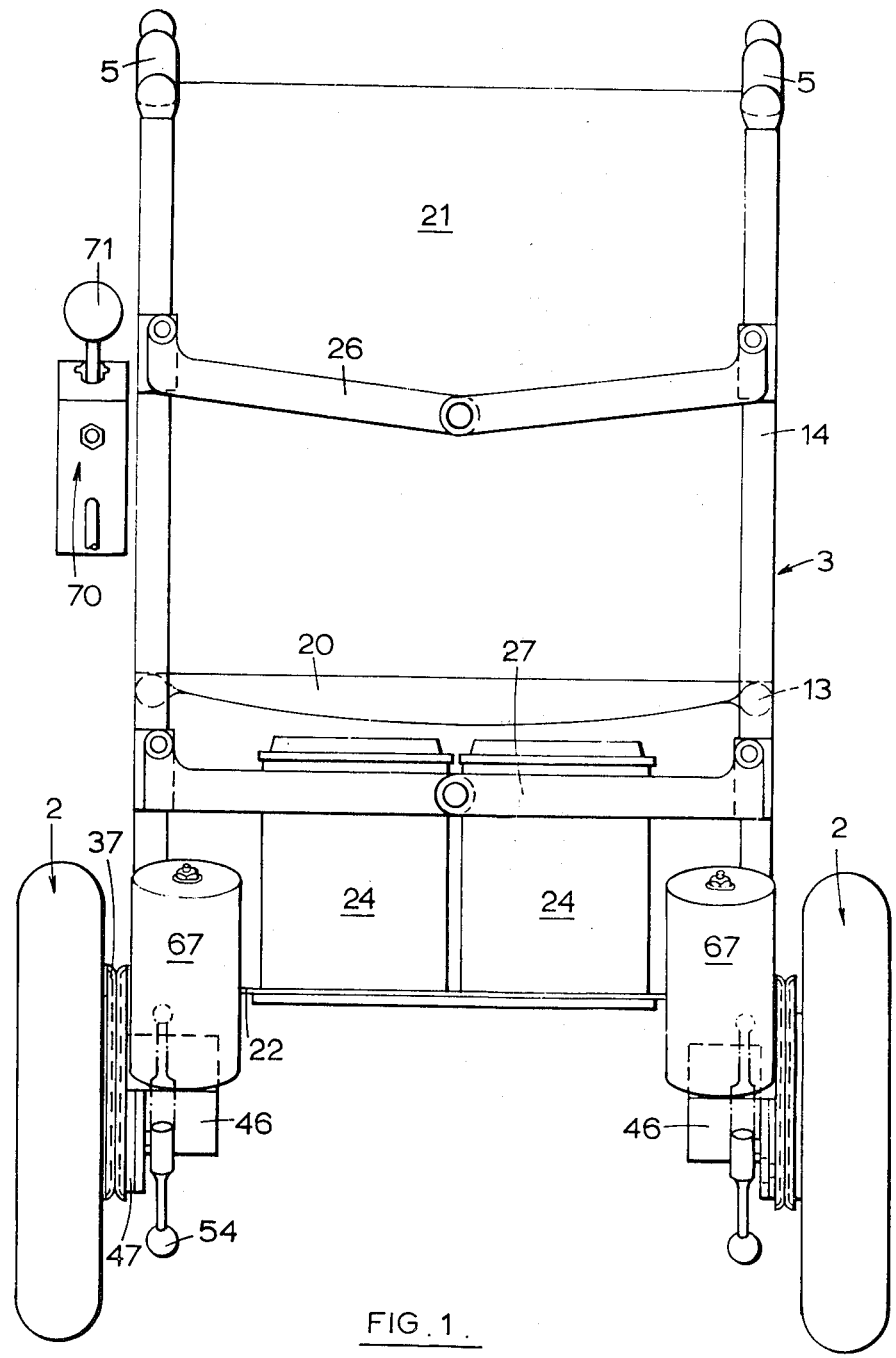
FIG. 1 is a rear view of the wheel chair.
Figure 2:
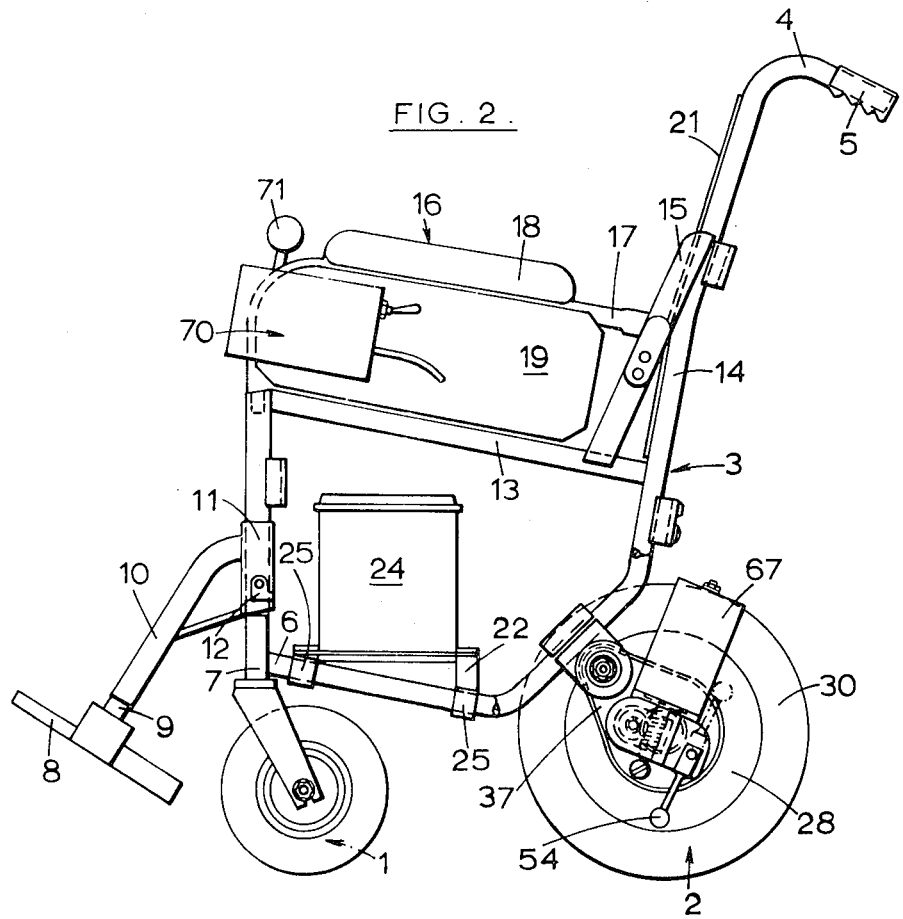
FIG. 2 is a side view of the wheel chair with the nearside wheel and associated driving means being omitted for clarity.
Figure 3:
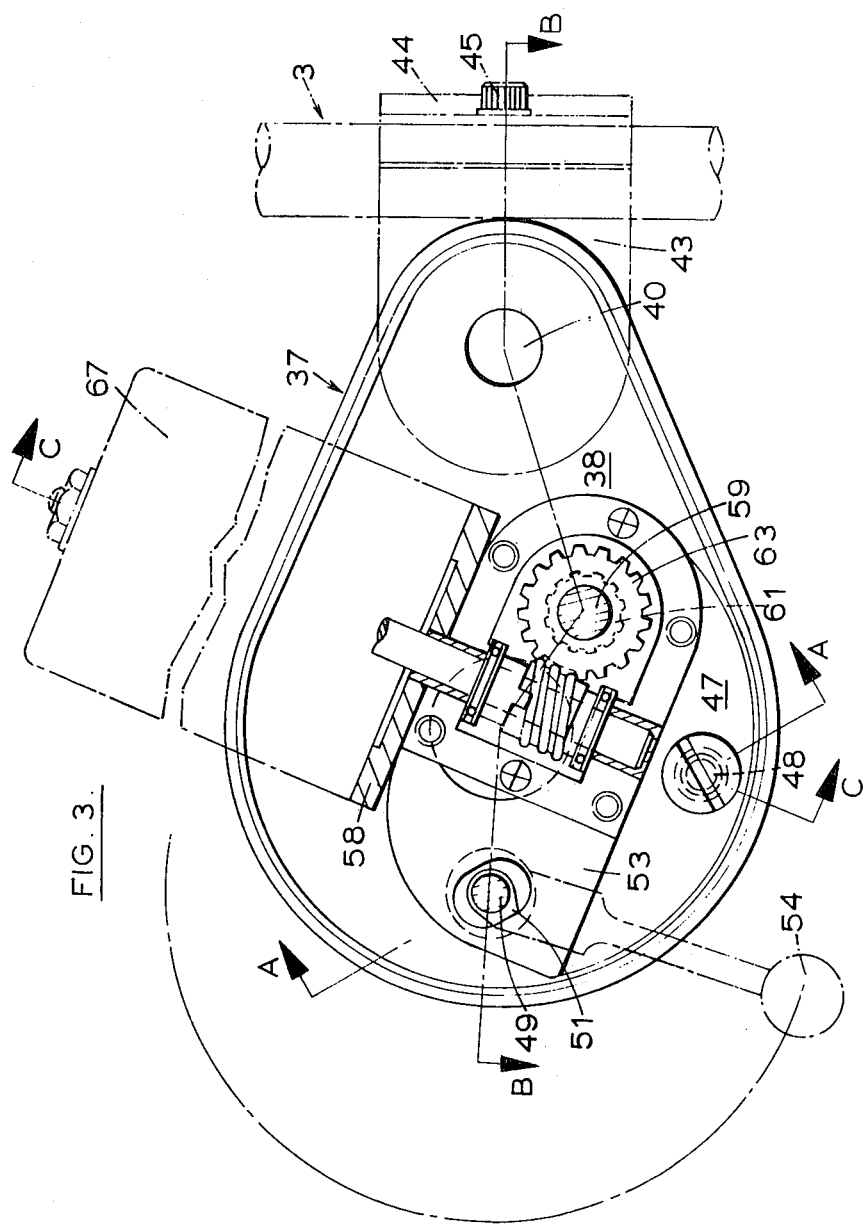
FIG. 3 is an enlarged detail view of the driving means depicted in FIG. 2 with certain parts omitted for clarity.
Figure 4:
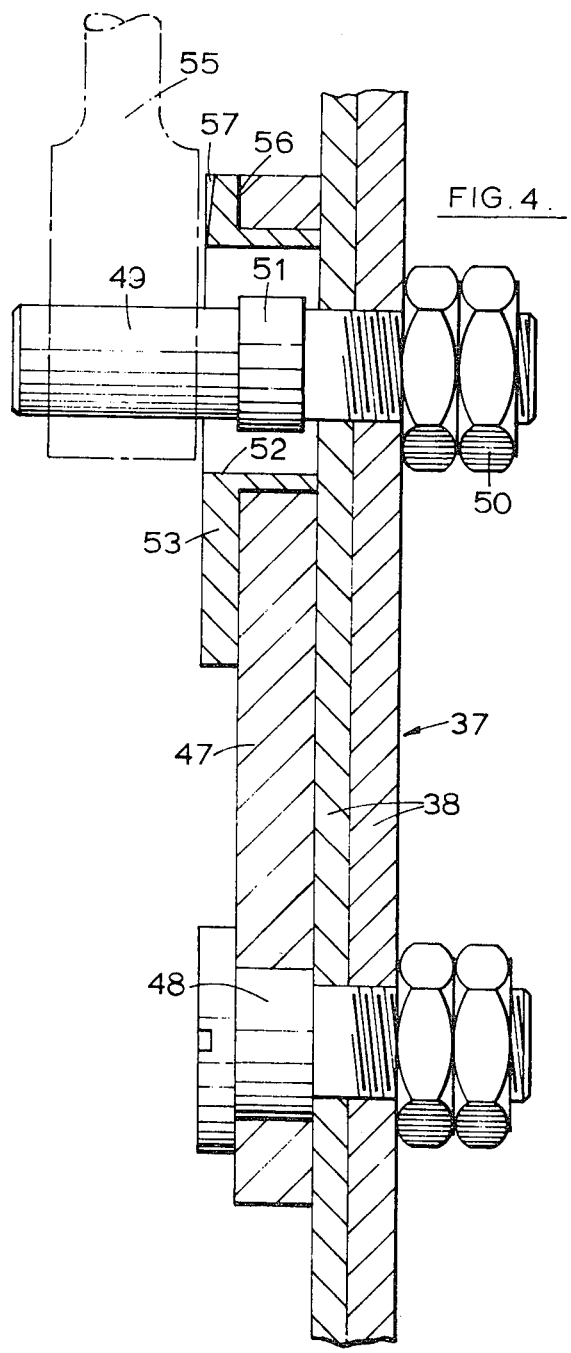
FIG. 4 is an enlarged section on line A—A of FIG. 3.
Figure 5:
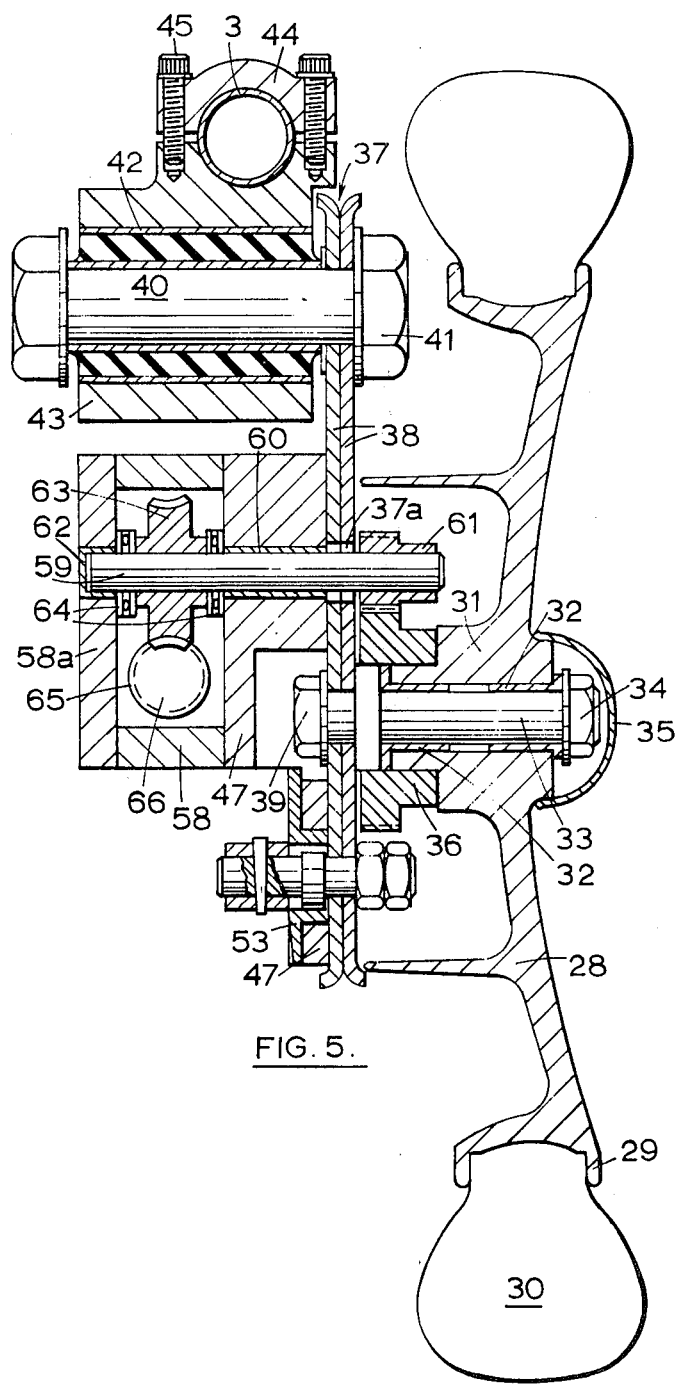
FIG. 5 is a section on line B—B of FIG. 3 and including the wheel.
Figure 6:
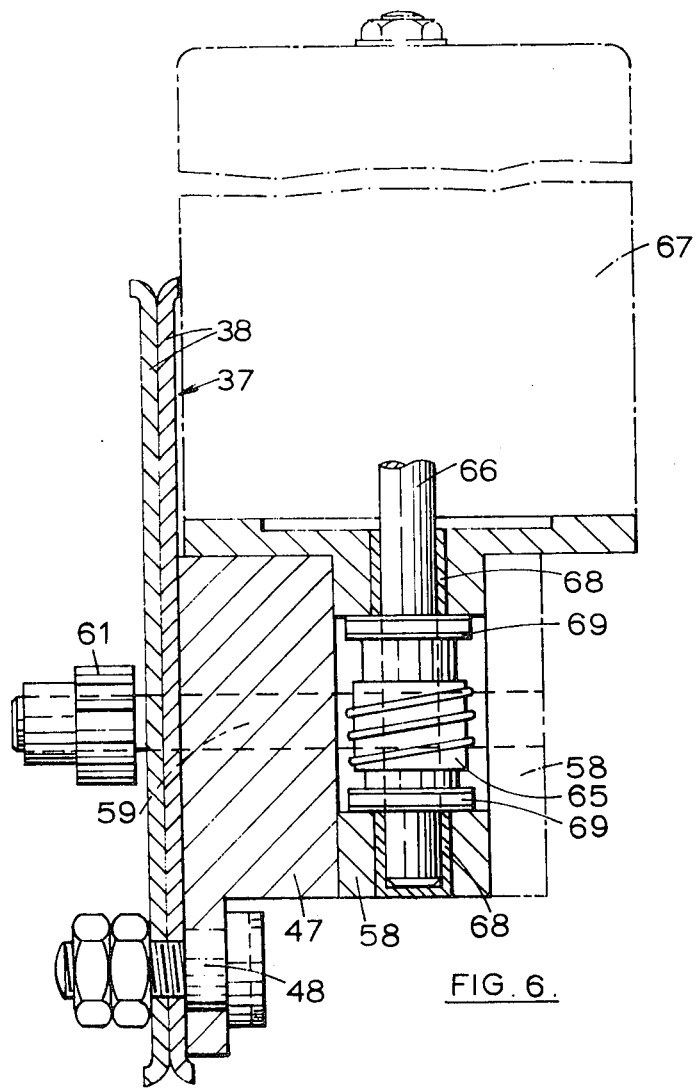
FIG. 6 is a section on line c—C of FIG. 3.

With reference to the accompanying drawings, the wheel chair comprises a tubular, foldable frame made principally of a light alloy supported on a pair of front castor wheels 1 and a pair of rear wheels 2 driven by the electric driving means according to this invention.

The frame comprises two main members 3 each of substantially L-shape having a rearwardly inclined upper handle portion 4 covered by a hand-grip 5 by means of which the wheel chair may be propelled manually. The lower end portion 6 of each main member is rigidly connected to the lower end of one of two front members 7 extending substantially vertical and carrying one of the castor wheels 1. Each front member 7 detachably carries a foot-rest 8 which is mounted on a stem 9 adjustably received within one end of a footrest hanger 10, the other end of the hanger being connected to a channel-shaped bracket 11 which embraces the front member 7 and is releasably locked thereto by a pin and slot connection 12.

One of two seat support members 13 is fixed to the upper end of one of the front members 7 and the upstanding part 14 of the associated main member so that the seat support members extend substantially slightly downwardly and rearwardly inclined to the horizontal. Each seat support member 13 is also connected to the upstanding part 14 of the associated main member by a strut or link 15 and one of a pair of detachable arm rests 16 releasably engages with the strut 15 and a fixing such as a socket provided on the upper end of the associated front member. The arm rest 16 comprises a tubular L-shape element 17 carrying an elongated cushion 18 and a modesty panel 19.

A seat panel 20 of a flexible material extends between the two seat support members 13 and a similar back-rest panel 21 extends between the upstanding parts 14 of the two main members.

A carrier 22 supporting two 12 volt batteries 24 extends between the lower parts 6 of the two main members and is detachably mounted therefrom by opposed pairs of open side brackets 25 only partially embracing the respective parts of the two main members so that the carrier 22 may be lifted for removal when the wheel chair is to be folded.

The upstanding parts 14 of the two main members are connected together by upper and lower hinged links 26, 27 and the two front members 7 are also connected by a hinged assembly including two pairs of links (not shown). When the battery carrier 22 is removed these links enable the wheel chair to be folded with the two main members 3 being disposed side-by-side. Preferably, at least one of the links is arranged to maintain the wheel chair in the operative position (as shown) and to retain it against such folding movement when in use. This may be provided by a double link assembly in which the hinges permit the links being pivotted to an over-center locked position; alternatively an interlocking or manual fastening may be provided.

Each rear wheel 2 comprises a cast body 28 providing an annular rim 29 supporting a pneumatic tire 30. The body 28 has an inner concentric boss 31 with internal flanged sleeve bushings 32. A wheel spindle 33 extends through the bushing 32 and carries a locking nut 34 on its outer end for releasably securing the wheel on the spindle. The locking nut 34 is covered by a dust cap 35 secured to the wheel boss. Preferably, the bushing 32 is made from a low-friction plastics material. The inner end of the boss carries a fixed drive pinion 36 concentric with the wheel spindle 33.

Each rear wheel is carried from the associated main member by a wheel plate assembly 37 comprising a pair of lipped steel pressings 38 of elleptical shape welded back-to-back. Alternatively, the wheel plate may comprise a single thick plate carrying a lipped, relatively thin plate serving as a dust and dirt excluder. The inner end of the wheel spindle 33 extends through a piercing in the wheel plate 37 and a nut 39 secures the spindle 33 and wheel thereto.

The narrow end of the wheel plate 37 has a further piercing through which one end of a resiliently mounted suspension pin 40 extends with a nut 41 on the protruding end of the pin securing the pin 40 and wheel plate 37 together against relative movement. The pin 37 is connected to a rubber bonded bushing 42, such as sold under the Trade Mark METALASTIK, and this is seated within a bore in a bracket casting 43. The bracket casting 43 is formed with a part cylindrical groove extending normal to the bore and the elbow of main member 3 is received within the groove and clamped therein by a complementary bracket part 44 secured to the bracket casting by bolts 45.

As will be understood the resiliently mounted suspension pin 40 provides a support carrying the wheel plate 37 and wheel whilst permitting limited resilient springing movement of the wheel relative to the wheel chair frame. As each rear wheel is independently mounted, the rear of the wheel chair has a spring suspension which reduces discomfort to the occupant and increases stability of the wheel chair during movement.

A gear box 46 for transmitting drive to the wheel pinion 36 comprises a support plate 47 by which the gear box is pivotally mounted on the wheel plate 37 through a stepped pivot pin 48 extending through a piercing in the wheel plate 37 The pivot axis of the support plate 47 is parallel to the wheel spindle axis but disposed below and forwardly thereof.

A cam shaft 49 is mounted in a further piercing in the wheel plate 37 and secured by nuts 50 to the wheel plate for relative rotational movement. The pivot axis of the cam shaft 49 is parallel to the wheel spindle axis but extends in the plate containing the axes of the wheel spindle and the suspension pin. The cam shaft 49 carries a fixed single lobe cam 51 which is seated within an elongated recess 52 in a hardened steel cam plate 53 tightly housed within an aperture in the back plate 47. The cam shaft 49 has an operating handle 54 pinned thereto. The handle 54 has a flat sided boss 55 of which the face adjacent the cam plate is adapted to engage with the adjacent face of a peripheral flange 56 of the cam plate to clamp the support plate 47 and the wheel plate 37 together against relative pivotal movement when the handle is in either extreme operative positions. The adjacent face of the flange is provided with a taper 57 which extending circumferentially relative to the cam shaft axis for about 180° so that between the extreme operative positions of the handle 54, the boss 55 does not apply clamping pressure to the support plate 47 and relative pivotal movement may occur.

The gear box 46 further comprises a motor plate 58 and a cover plate 58a. A shaft 59 is mounted for rotation in a bushing 60 seated within a bore in the support plate 47. The shaft axis extends parallel to the axis of the wheel spindle but is offset therefrom and the end of the shaft nearest the wheel protrudes from the housing and through a slot 37a in the wheel plate 37. Said end carries a driven pinion 61 which is arranged to mesh with the drive pinion 36 on the wheel hub when the drive is operative as shown. The other end of the shaft 59 is received within the bush 62 in a closed bore in the cover plate 58a and adjacent to this end the shaft 59 carries a worm wheel 63 mounted between two thrust races 64 and rotatable with the shaft.

The worm wheel 63 is engaged with a worm 65 carried on the end of a drive shaft 66 of an electric motor 67. The drive shaft 66 is rotatably mounted in the housing by pairs of bushings 68 and thrust races 69 between which the worm 65 is located for rotation with the drive shaft 66. The motor 67 is rigidly mounted in the motor plate 58.

The electric motors 67 are each independently connected to one of the batteries 34 through a manually operable progressive control unit 70. Such control unit may be of any suitable known kind whereby a control handle 71 may be manipulated from a neutral control stop position to a forward or rearward position with the distance of the movement of the handle being proportional to the power output to the motor to control the speed thereof. The control handle 71 also may be moved from one side or the other to control turning movement. In this invented wheel chair as the electric motors are independent then the movement of the control handle 71 to one side is arranged to provide forward driving to one motor and reverse driving to the other motor so that very small turning circles or arcs may be achieved. However, any similar form of control unit could be utilised. Of course the control unit includes an on/off switch and the wiring harness (not shown) includes any suitable means for electrically connecting the batteries to a charging unit of suitable type.

In use of the aforedescribed wheel chair when the driving means is operative the two operating handles 54 are in the raised position, and the wheel plate 37 and the support plate 47 are clamped together against relative pivotal movement. The drive pinion 36 is engaged by the driven pinion 61 and by the manual operation of the control unit the wheel chair may be driven by the appropriate actuation of the electric motors.

To render the driving means inoperative, the operating handles 54 are rotated through approximately 180° and this rotates the cams 51 which are respectively engaged with their cam plates. The engagement of each cam and cam plate is arranged so that when the cam is rotated through approximately 180°, the back plate 47 carrying the gear box is pivotted about the pivot pin 48 to angularly displace the support plate 47 relative to the wheel plate 37. On reaching the extreme position, the respective wheel plate 37 and the support plates 47 are clamped together again, the two plates being unclamped whilst the handle is rotated to permit such pivotal movement. On such pivotal displacement of the support plate the driven pinion 61 is disengaged from the fixed drive pinion 36 and there is no connection between the wheel and the driving means. Accordingly the wheel chair may be manually advanced in the conventional manner, and as the driving means is completely disconnected, an ambulant pusher or the chair occupant does not have to utilise any excessive effort to propel the chair despite the fact that the wheel chair embodies electric driving means.

It is envisaged that this invention could be utilised with wheel chairs having alternative forms and constructions of frames, and the wheel chair does not have to be foldable or collapsible.

It is also envisaged that the electric driving means may comprise an assembly of a wheel complete with motor gear box and suspension mounting and other associated parts which could be fitted to an existing wheel chair frame instead of one of the original rear wheels. It is also feasible that the electric driving means may be embodied in the front wheel of a wheel chair.

Other alternatives and modifications for special applications will be apparent to those skilled in this field, but the advantages of this invention will be obvious especially in view of the compactness, versatility and simplicity of the invented driving means.

I claim:

1. In a wheelchair, electric driving means comprising an electric motor, battery power means connected to said electric motor through control means, drive transmitting means cpupled to said electric motor and including an output shaft, a driven pinion on said output shaft, a fixed pinion engageable with said driven pinion, a wheel plate carrying said fixed pinion and supporting a rotatable wheel, a ground-engaging tire supported on said wheel, and said fixed pinion being disposed inwardly of said ground-engaging tire, a mounting bracket mounting said wheel plate on a frame member of the wheel chair, a bushing of said mounting bracket including a suspension media arranged to permit resilient movement of said wheel plate independent of said frame member, and means supporting said drive transmitting means on said wheel plate for relative pivotal movement between two extreme positions in the first of which said driven pinion and said fixed pinion are interengaged for driving said wheel on operation of said electric motor, and in the second of which said driven pinion is disengaged to permit free rotation of said wheel.

2. Electric driving means according to claim 1 wherein said mounting bracket includes a suspension pin connected to said wheel plate and mounted in said bushing.

3. Electric driving means according to claim 1 wherein said means supporting said drive transmitting means also supports the electric motor, said supporting means comprising a plate pivotally mounted on said wheel plate.

4. Electric driving means according to claim 3 wherein said pivotal plate is movable between said first and second extreme positions by a manually operable cam shaft acting between said pivotal plate and said wheel plate.

5. Electric driving means according to claim 4 wherein said cam shaft is rotatably mounted on said wheel plate and carries a fixed cam engaging with a cam plate carried by said pivotal plate.

6. Electric driving means according to claim 5 wherein said cam plate includes a recess in which said fixed cam is seated engaging with cam faces on the sides of the recess.

7. Electric driving means according to claim 6 wherein said cam plate has a peripheral flange engageable with an operating handle of said cam shaft to clamp said wheel plate and pivotal plate together when said pivotal plate is in both of said extreme positions.

8. Electric driving means according to claim 7 wherein said peripheral flange has a taper engageable with said operating handle during movement of the handle between both extreme positions to release said clamping action.

9. Electric driving means according to claim 3 wherein said drive transmitting means includes a gear box carried by said pivotal plate, said gear box comprising said output shaft coupled to said electric motor by a worm wheel carried on said output shaft and engaging with a worm driven by said electric motor.

10. Electric driving means according to claim 9 wherein said output shaft of said drive transmitting means protrudes through a clearance in said wheel plate accommodating pivotal movement of said output shaft and said driven pinion engages with said fixed pinion which is fixed to the wheel hub.

11. Electric driving means according to claim 10, wherein said wheel includes a body having an annular web extending from an outer peripheral region supporting said ground-engaging tire to an inner peripheral region including said hub integral with said web and of bush-form, and further comprising a stub shaft fixed to said wheel plate and rotatably mounting said wheel body on said wheel plate.

12. Electric driving means according to claim 11 wherein said control means comprises a manually operable progressive control unit.

* * * * *